Sept. 16, 1952 S. D. BRADLEY 2,610,713
SEALING STRIP
Filed Dec. 10, 1948 2 SHEETS—SHEET 1
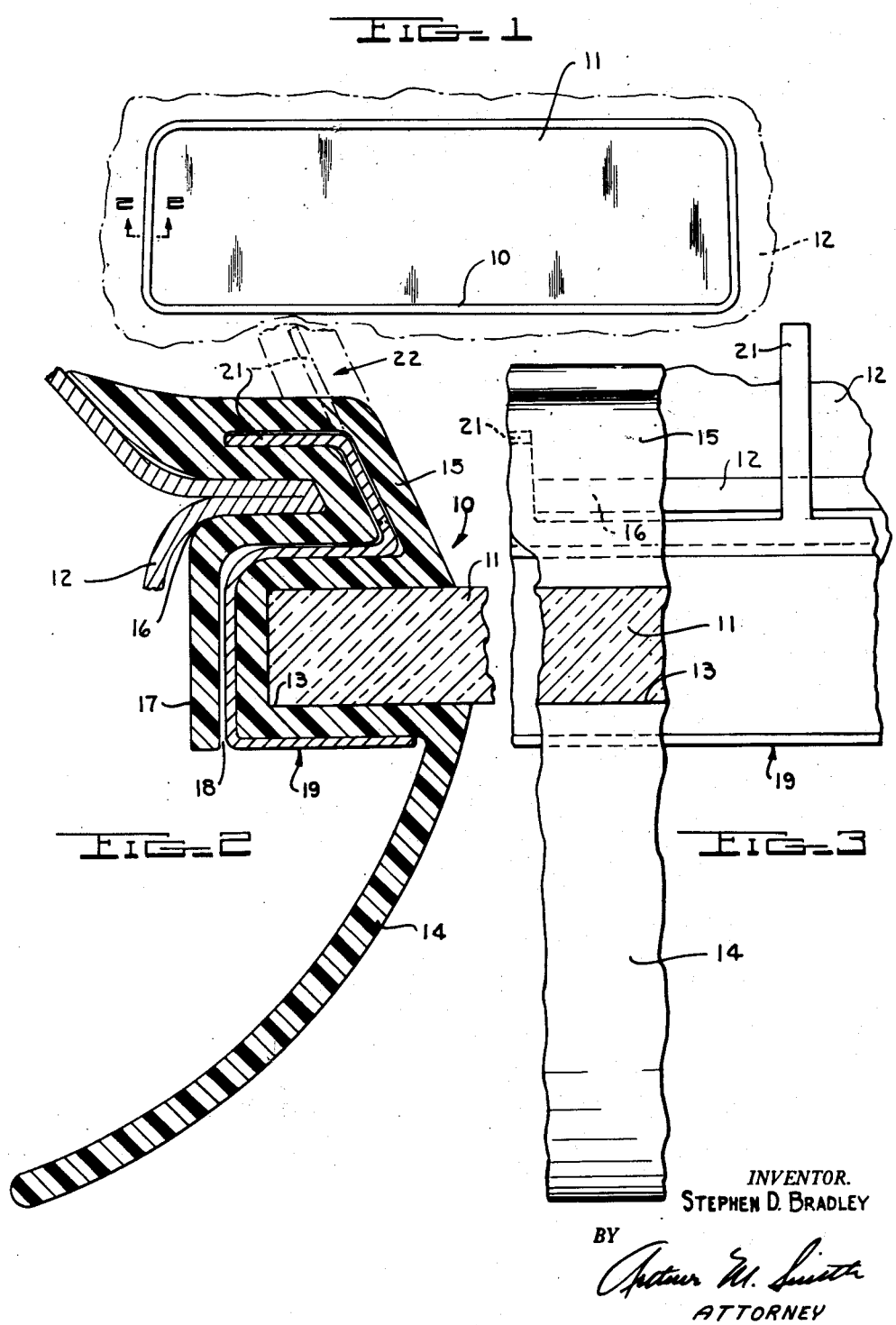
INVENTOR.
STEPHEN D. BRADLEY
BY
ATTORNEY Sept. 16, 1952     S. D. BRADLEY     2,610,713
SEALING STRIP
Filed Dec. 10, 1948                  2 SHEETS—SHEET 2
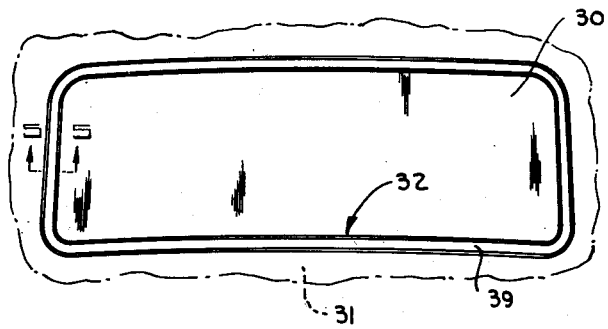
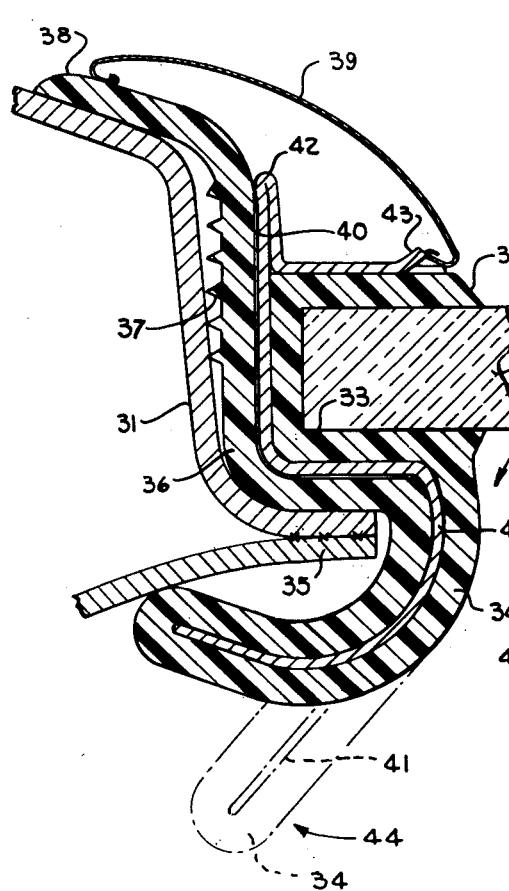
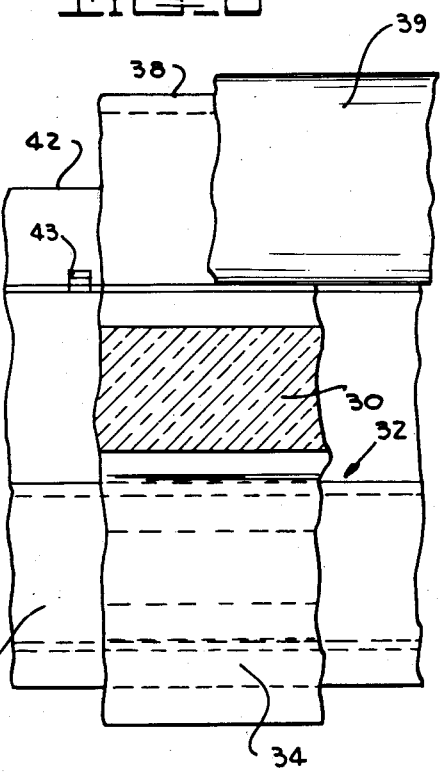
INVENTOR.
STEPHEN D. BRADLEY
BY
ATTORNEY Patented Sept. 16, 1952

2,610,713

UNITED STATES PATENT OFFICE 2,610,713

SEALING STRIP

Stephen D. Bradley, Detroit, Mich., assignor to Detroit Macoid Corporation, Detroit, Mich., a corporation of Michigan Application December 10, 1948, Serial No. 64,639

8 Claims. (Cl. 189—78)

The present invention relates to a sealing strip and more particularly to a resilient sealing strip such as is utilized in joining separate panels in edge to edge relation. In one embodiment here shown by way of example, such a sealing strip may be used for mounting a fixed glass panel in an opening provided in a sheet metal panel. Particular examples of such use are found in the automotive field wherein such glass panels are widely used as fixed windshields and as fixed rear body windows.

The sealing devices which are used at the present time consist of an elastic or resilient extruded channel strip which provides a channel portion in which the edges of the glass panel are mounted and in which other portions are provided for engaging with a structural part of the car body as for example the edges of the sheet metal body panels for holding the said channel strip and the glass panel in place in the body opening. Due to variations in sizes of the glass panels and variations in the dimensions of the openings in sheet metal panels, it has been found that the glass holding channel portion of the strip is frequently deformed in such a manner as to make difficult the proper water-tight attachment of the strip to both the glass panel and to the edges of the opening in the car body. Any space occurring between the sealing strip and the glass or between the sealing strip and the body panels must therefore be avoided to prevent leakage.

Where such prior sealing strips have been formed of an extruded rubber or resilient plastic composition, it has been found that the aging and deterioration of such materials will change its original resiliency in such a manner that leakages will occur both between the strip and the glass and between the strip and the edges of the opening in the body.

It is a principal object of the present invention, to provide a resilient sealing strip which provides a weather-tight joint and a cushioned mounting for the edges of a glass panel mounted therein and in which a clamping member is combined with said sealing strip to draw the resilient sealing material into intimate weather-tight contact with all joined edges of the connected panels and to maintain such intimate contact during the service life of the strip.

It is a further object of the present invention to provide a sealing strip which can be installed economically by unskilled workmen in large scale mass assembly of the panels to be joined by the said sealing strip.

Other objects of this invention will appear in the following description and appended claims, reference being had to the accompanying drawings forming a part of this specification wherein like reference characters designate corresponding parts in the several views.

In the drawings:

Fig. 1 is a front elevation of a fixed panel vehicle windshield in which a panel of glass is joined by the sealing strip of the present invention to the edges of the windshield opening in the sheet metal panel of the vehicle body which is indicated in phantom lines.

Fig. 2 is an enlarged section with portions shown in part, taken substantially on the line 2—2 in the direction of the arrows, Fig. 1, and indicating in phantom line the position of portions of the sealing strip before being forced into the assembled position.

Fig. 3 is an enlarged fragmentary front elevation of the sealing strip shown in Fig. 2, with portions of the elastic covering broken away and showing the interior construction.

Fig. 4 is an elevation of a rear window mounted in the rear window opening of the sheet metal panel of a vehicle body which is indicated in the phantom lines, and in which the sealing strip of the present invention is utilized.

Fig. 5 is an enlarged section with portions shown in part and taken substantially on the line 5—5 in the direction of the arrows, Fig. 4.

Fig. 6 is an enlarged fragmentary elevation of the sealing strip shown in Fig. 5 with portions of the elastic covering broken away and showing the interior construction.

Before explaining the present invention in detail it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

In its preferred embodiment the sealing strip of the present invention consists of a yieldable body portion comprising a preformed contoured non-metallic strip preferably formed of an elastomeric plastic such for example as a polyvinyl material or a rubber compound. Inside the body portion, a metallic body member is mounted to provide a clamping and holding element which holds the lips of the channels in the yieldable body portion in weather-tight engagement with the adjacent edges of the connected panels.

While the invention is here disclosed for use in automobile body construction, it is to be understood that its use is not limited to this field as the strip may be used to advantage in any construction where adjacent panel edges are to be joined in a weather-tight joint. Other adaptations of the present invention include, by way of example, panels used in prefabricated building constructions, window glass mountings used in all types of vehicles, and window glass mountings used in the construction industry, particularly the large fixed glass panels frequently identified as so-called "picture windows."

The yieldable non-metallic body portion is separately formed by any known molding or extrusion processes and can be supplied in long lengths from which portions of the proper length may be cut as desired. The metallic body member is inserted in a recess groove provided in the yieldable non-metallic body portion. Suitable lengths are cut off as required for the particular installation. In some instances, the strip is bent to extend around one of the panels to be joined and is united at its ends to form a continuous element. In other instances it may be cut to lengths required to form mitered joints at the corners of the panel. In other instances it may be used as a single length of strip for joining the edges of two panels of substantially equal lengths.

A sealing strip of the present invention is shown in two of its possible forms in the drawings. Referring to Figs. 1, 2 and 3, the sealing strip 10 comprises a yieldable non-metallic body which connects the edges of the fixed glass windshield panel 11 with the edges of the windshield opening provided in the body panel 12, provides a resilient cushion therebetween, and seals the peripheral space between the edges of the joined panels. As shown in Fig. 2, the strip 10 is formed in one piece to provide a U shaped glass retaining channel portion 13, which overlies the edge and a portion of the sides of the glass windshield panel 11.

One edge of the channel 13 merges into an overhanging downwardly curved lip 14 which may be utilized as the outside garnish molding, in which event, the entire sealing strip is preferably formed from a resilient plastic material of a suitable color. When so used, the sealing strip replaces the conventional metal garnish trim molding and anti-squeak strip required therewith. The opposite edge of the channel portion 13 merges into an extending wing portion 15 having an elongated resilient lip which lies tightly against a face of the body panel and provides a tight seal thereon. A U shaped channel 16 for receiving and overlying the edge and part of the side portion of the opening in the body panel 12 is provided in the wing portion 15. An extending lip 17 is provided adjacent one edge of the channel 16 and extends under the bottom of the channel 13 and in spaced relation thereto. A reversely curved channel 18 is provided in the body strip 10 and extends between the lip 17 and the channel 13 and extends in spaced relation around the three sides of the channel 16. A metal strip indicated generally by the numeral 19 is located in the channel 18 and has a U shaped portion which extends around the closed end of the U shaped channel 13. One edge of the metal strip 19 is provided with spaced tabs 21 which occupy the dotted line positions shown in Fig. 2 prior to assembly of the panels.

In assembly, the strip 10 is preferably mounted on the glass panel 11 whose edges are gripped in the U shaped channel 13. The glass panel 11 and the attached strip is then positioned in the opening in the body panel 12 and the U shaped channel 16 is positioned over the edge of the body panel 12. The metal tabs 21 occupy the position shown in dotted line in Fig. 2 until a force is applied as indicated by the arrow 22 which causes the tabs 21 to be bent over the adjacent edges of the panel 12 and to be engaged tightly therewith. This bending of the metal tabs 21 exerts a clamping force on the entire sealing strip 10 and causes it to engage the edge portions of the glass panel 11 tightly in the channel 13 in a weather-tight seal at the same time that the edges of the panel 12 are engaged by the channel 16 in a similar weather-tight seal.

The construction shown in Figs. 4, 5 and 6 is similar in general operation and function to that shown in Figs. 1, 2 and 3, but its construction is modified as required to adapt it more particularly for use in providing a recessed mounting of a window panel outside an attaching flange provided around the window opening in the body panel.

As here shown, the glass panel 30 is connected with the body panel 31 by the connector strip 32 which comprises an extruded or molded yieldable non-metallic body portion having an open U shaped channel 33 for receiving the edges of the glass panel 30. One side on the channel 33 terminates in a bevelled edge as at 33A. The other side of the channel merges into the extending curved hook portion 34 which engages the offset attaching flange 35 of the body panel 31. A lip 36 extends from the hook portion 34 under the channel 33 and is provided with downwardly opening toothed serrations 37 which engage with the adjacent surface of the body panel 31. The serrations 37 assist in permitting the strip to conform readily to the contours of the panel surface to effect a weather-tight seal and also provide an additional cushioning effect. The lip 36 terminates in the extending flap 38 which underlies the metallic trim molding 39. The said trim molding 39 provides a metallic frame which extends around the entire window opening.

An open channel 40 is provided in the strip 32 and a metallic clamping strip 41 is placed therein and extends in spaced relation around the closed end of the U shaped channel 33 and has deformable tab portions extending into the hook portion 34. The metallic strip 41 is also folded to provide an extending arm portion 42 which aids in holding the lip 36 in intimate contact with the adjacent face of the body panel. An upturned lug 43 is formed on the strip 41 which has a snap engagement with the turned inside flange of the metal trim molding 39 to assist in holding it in position.

In this embodiment of the invention the tabs on the metallic strip 41 are bent from the dotted line position shown in Fig. 5 to the solid line position there shown by the application of pressure in the direction indicated by the arrow 44. This causes the hook portion 34 of the sealing strip to engage the flange 35 in a weather-tight seal and also exerts clamping forces on the channel 33 causing it to be tightened to form a weather-tight seal with the surfaces of the glass panel 30.

From the foregoing it will be seen that I have provided a sealing strip in which a yieldable non-metallic cushioning channel strip is provided to engage the edges of the panels to be connected, and in which the engagement between the channel strip and the edges of the panels is increased and strengthened by a deformable metallic strip inserted in an interior channel provided in the body of the said yieldable non-metallic cushioning channel strip. The metallic strip is readily deformed during mounting of the panels and acts to increase the tightness of the seal between the sealing strip and the faces of the joined panels. It remains as a permanent part of the sealing strip and continues to exert a clamping force on the resilient portions thereof during the entire service life of the strip.

Having thus described my invention, I claim:

1. A sealing strip for connecting adjacent edges of joined panels and for sealing the joint therebetween irrespective of small variations or irregularities that may exist in spacing of said adjacent edges, said strip comprising a yieldable non-metallic cushioning strip having open channels for receiving the edges of the panels to be joined and having an internal channel, a metallic strip in said internal channel and having portions extending around the closed ends of said open channels so that bending of said portions toward said open channels will exert a clamping action on the opposite sides of said open channels and clamp said yieldable non-metallic cushioning strip in weather-tight engagement with the edge portions of the connected panels, said metallic strip being loosely inserted in said internal channel so that it can be bent to accommodate small variations or irregularities in the spacing of said adjacent edges while permitting the non-metallic cushioning strip to receive the edges of the panels in weather-tight engagement.

2. A sealing strip for connecting adjacent edges of joined panels and for sealing the joint therebetween irrespective of small variations or irregularities that may exist in spacing of said adjacent edges, said strip comprising a resilient sealing strip member having reversely opening channels therein for receiving the adjacent edges of the panels to be joined and having an internal channel therein extending around the closed end of one of the open channels to the opposite side of the other channel, and a metallic strip in said internal channel and having an end portion extending outwardly therefrom, said metallic strip having each of its ends bent toward the reversely opening channels so that a clamping force may be exerted on the resilient sealing strip to maintain a weather-tight seal between the sealing strip member and the adjacent edges of the panels, said metallic strip being loosely inserted in said internal channel so that it can be bent to accommodate small variations or irregularities in the spacing of said adjacent edges while permitting the non-metallic cushioning strip to receive the edges of the panels in weather-tight engagement.

3. A sealing strip as claimed in claim 1 and further characterized in that said metallic strip comprises extending lug portions which overlie an edge of one of said open channels and which are bent after the panels are in their joined positions to increase the clamping pressure between the panels and said open channels and to form a weather-tight seal therebetween.

4. A sealing strip as claimed in claim 1 and further characterized in that lugs are provided on said metallic strip to permit attachment of a trim molding thereto.

5. A sealing strip as claimed in claim 4 and further characterized in that said yieldable non-metallic cushioning strip comprises an extruded elastic member having elastic sealing flaps adapted to overlie a portion of the surfaces of one of the joined panels.

6. A sealing strip for connecting adjacent edges of joined panels and for sealing the joint therebetween, said strip comprising a resilient sealing strip member having reversely opening channels therein for receiving the adjacent edges of the panels to be joined and having an internal channel therein extending around the closed end of one of the open channels to the opposite side of the other channel, said sealing strip member having a relatively long lip portion projecting therefrom to form a trim overlying an adjacent face of one of the joined panels, and a metallic strip loosely inserted in said internal channel and having an end portion extending outwardly therefrom, said metallic strip having each of its ends bent toward the reversely opening channels so that a clamping force may be exerted on the resilient sealing strip member to maintain a weathertight seal between the sealing strip member and the adjacent edges of the panel.

7. A sealing strip as claimed in claim 6 and further characterized in that said relatively long lip portion in said resilient sealing strip member is curved and contoured to form a non-metallic garnish trim molding.

8. A sealing strip as claimed in claim 6 and further characterized in that said metallic strip includes a plurality of upturned lugs for receiving and holding a separate trim molding in intimate contact with a surface of said resilient sealing strip member.

STEPHEN D. BRADLEY.

REFERENCES CITED

The following references are of record in the file of this patent:

UNITED STATES PATENTS

| Number | Name | Date |
| --- | --- | --- |
| 2,261,038 | Sherts | Oct. 28, 1941 |
| 2,270,036 | Conlon | Jan. 13, 1942 |
| 2,456,175 | Coppock et al. | Dec. 14, 1948 |

FOREIGN PATENTS

| Number | Country | Date |
| --- | --- | --- |
| 100,311 | Australia | 1937 |